Patented Mar. 17, 1925.

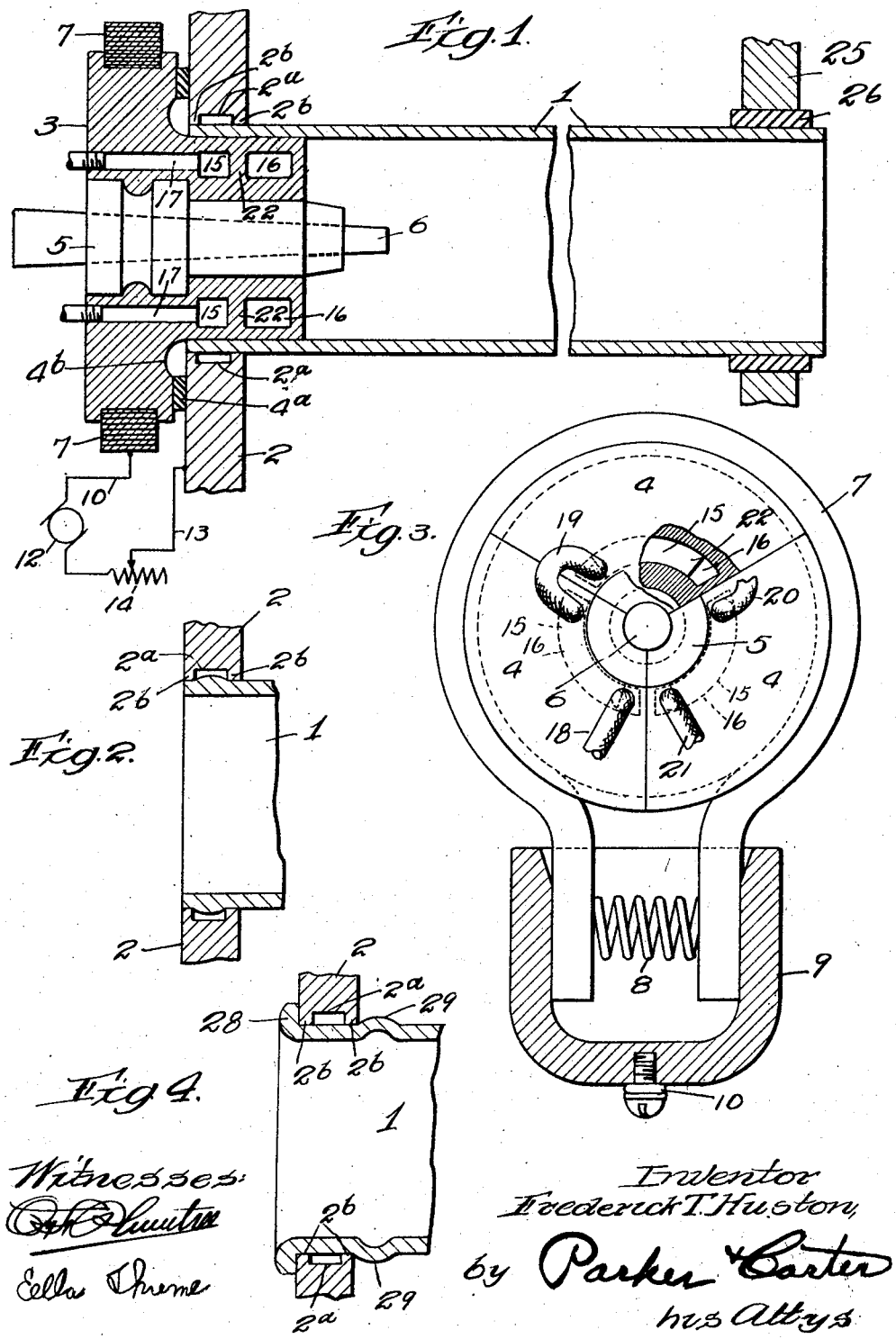

1,530,266

UNITED STATES PATENT OFFICE.

FREDERICK T. HUSTON, OF FORT WAYNE, INDIANA.

BOILER-TUBE CONNECTION.

Application filed February 14, 1916, Serial No. 78,143. Renewed June 22, 1922. Serial No. 570,185.

*To all whom it may concern:*

Be it known that I, FREDERICK T. HUSTON, a citizen of the United States, residing at Fort Wayne, Indiana, have invented a certain new and useful Improvement in Boiler-Tube Connections, of which the following is a specification.

This invention relates to boilers and the process of making same, and has for its object to provide a new boiler and a new process for electrically welding boiler tubes to the flue sheets.

The invention is illustrated in the accompanying drawings, wherein—

Figure 1 is a sectional view through a boiler tube and a portion of the two flue sheets with the welding terminal in position and before the welding has been completed;

Figure 2 is a sectional view through the end of the boiler tube and a portion of the flue sheet after the welding has been completed;

Figure 3 is an end view of the welding terminal;

Figure 4 is a view similar to Fig. 2 showing a modified construction.

Like numerals refer to like parts throughout the several figures.

In the drawings I have shown one form of apparatus for carrying out my process. In this construction the end of the boiler tube 1 is inserted in the opening in the flue sheet 2, the end face of the tube being preferably flush with the face of the flue sheet. In the end of the boiler tube 1 I insert an extensible or expansible electrical terminal 3 which is preferably of copper. As illustrated in Fig. 3, this terminal is made up of a plurality of sections 4, with means for forcing them outwardly so as to provide the desired pressure between the terminal and the inner face of the tube 1. This is accomplished by means of a steel expander located between these sections and consisting of the outer expansible part 5 preferably made in sections, which engages the sections 4 and which has a tapered hole therethrough, there being a tapered pin 6 in said hole, which when driven in, expands the sections 4 so as to tightly press them against the inner face of the tube 1. The terminal is provided at its periphery with a flexible device 7, preferably made up of a series of strips of metal, such as copper, and through which the current is conducted to the terminal, the flexibility of the device permitting the terminal to expand as hereinbefore set out. The flexible conducting device 7 is preferably located in a groove in the terminal and is tightly pressed against the terminal in any desired manner, as by means of a spring 8. This flexible conducting device is connected in circuit with a source of current supply 12 by the conducting piece 9 and the conductor 10. The other terminal of the source of current supply 12 is connected by a conductor 13 with the flue sheet 2, there being a suitable controller 14 in the circuit. It will be noted that the cross sectional area of the boiler tube is less than the cross sectional area of the flue sheet, and I therefore provide some means for equalizing this cross sectional area at the point of contact, thus permitting the boiler tube and the flue sheet to be brought to substantially the same heat at substantially the same time, thereby insuring the proper weld. This equalizing of the cross sectional area may be secured in any desired manner. In the particular construction shown I secure it by removing some of the metal of the flue sheet by providing a groove $2^a$ extending entirely therearound, thus forming the projections $2^b$, which engage the boiler tube. This construction also secures an additional strengthening effect, as hereinafter described. The electrical terminal 3 is preferably arranged so as to properly take care of the heat, thus preventing it from becoming overheated. Any suitable means for this purpose may be used. Under ordinary conditions the terminal itself will be able to take care of the heat on account of its size. I prefer, however, to provide some cooling means for this terminal. In the construction shown, I provide means for circulating a cooling liquid through the terminal. This may be done by providing passageways 15 and 16 in the terminal, that is, in the different sections of the terminal that project into the boiler tube, this being the point where the greatest heat is developed. These pasageways are then connected by other passageways 17, through which the liquid flows to and from them. In view of the fact that the sections of the terminal are separated from each other, the cooling liquid may pass in the one section 4 through the pipe 18, and then pass from said section to the next section, through the pipe 19, and from said latter section to the next section through the pipe 20, and then out through the pipe 21, thus forming a circulatory system whereby the cooling liquid is circulated through the terminal. In view of the fact that pressure is applied to the terminal, I prefer to have the passageways 15 and 16 separated by a wall or ribs 22. It will thus be seen that by means of this process a practically uniform pressure is secured throughout the entire inner surface of the boiler tube, and that a practically uniform pressure is also secured between the outer face of the boiler tube and the flue sheet, thus insuring the welding of the boiler tube to the flue sheet all the way around, and providing an absolute water-tight joint. When the heat is turned on and the parts are in the position shown in Fig. 2 and the metal is brought to the proper temperature, the pin 6 is driven into the expander, thus uniformly expanding the terminal and also uniformly expanding the end of the boiler tube, causing it to be welded to the flue sheet. At the same time a portion of the metal is forced outwardly into the groove 2ª in the flue sheet, thus acting as a lock to greatly strengthen the joint and prevent the two from being moved with relation to the flue sheet.

If it is desired to also weld the other ends of the boiler tubes to the other flue sheet 25, another electric terminal is placed in the end of the boiler tube and the current is simultaneously passed through both terminals so as to simultaneously weld both ends. Under ordinary conditions, however, it is only necessary to weld the ends of the boiler tubes nearest the fire-box, because these ends are subjected to very high temperatures, while the other ends are not subjected to these high temperatures. It is found in practice that with the method now generally used for connecting the ends of the boiler tubes with the flue sheets, the connection with the flue sheet near the fire-box is the one that gives trouble due to these high temperatures, and these connections at the fire-box end require continual repairing, all of which are avoided by the present process and construction. If it is only desired to weld the ends of the boiler tubes nearest the fire-box to the flue sheet, the other ends of the tubes are provided with insulating bushings 26 (see Fig. 1), so as to confine the current to one end of the tube. After the welding has been completed these insulating bushings are removed and replaced by metal bushings made of copper or other proper material, and these ends of the tubes are then rolled in the ordinary way to fasten them to the flue sheets.

In Fig. 4 I have shown the boiler tube with the end 28 rolled over so as to form a bead which engages the face of the flue sheet, there being a projecting part 29 which engages the other side of the flue sheet. I prefer, however, to make the end of the boiler tube flush with the flue sheet, as shown in Fig. 1, because excessive heat in the fire-box burns the end when formed into a bead, as shown in Fig. 4. The part 29 may also be omitted, because the portion of the tube which is forced into the groove 2ª acts as a lock to take the strain from the welded joint and prevent lateral movement of the tube with relation to the flue sheet. The pipes 18, 19 and 20 are arranged so as to permit the spreading out of the sections 4, and are preferably flexible pipes of any suitable construction. I also provide an insulator 4ª between the sections 4 of the electric terminal and the flue sheet, which is engaged by the sections 4 when the terminal is in its maximum in position, thus acting as a stop and at the same time preventing the current from passing to the flue sheet except by way of the boiler tube. The sections 4 have the axial parts which enter the tube and the lateral projecting parts which engage the insulating piece 4ª, a portion of the metal between these two parts being preferably cut away as shown at 4ᵇ. This cut-away portion is particularly adapted for use when the ends of the boiler tubes are provided with beads 28.

It will be noted that in the present case it is not necessary to cut away any portion of either face of the flue sheet, the flue sheet in each instance having smooth faces without cuts or recesses of any kind therein which would weaken them. And it is further noted that the weld between the boiler tube and the flue sheet is made between these two smooth uncut or unrecessed walls of the flue sheet, and that that portion of the tube between these two walls is the portion of the tube that is expanded during the process of forming the weld.

I claim:

1. A boiler comprising a flue sheet having an opening therethrough, a boiler tube having its end projecting into said opening in said flue sheet and welded to the flue sheet, and a locking part on said boiler tube intermediate the two walls of the flue sheet the material of the flue sheet being removed to form a free space on the outer side of said locking part, said locking part adapted to relieve the strain on the welded connection between the boiler tube and the flue sheet.

2. A boiler comprising a flue sheet having an opening therethrough, a boiler tube having its end extending into said opening, the flue sheet being provided with two separated projections, separated by a space, said separated projections engaging the outer face of the boiler tube and being welded to the boiler tube so as to form a tight joint, a portion of the boiler tube between said separated projections projecting into said space but free from a welding connection with said flue sheet.

3. A boiler comprising a flue sheet having an opening therethrough, a boiler tube having its end extending into said opening, the flue sheet being provided with separated projections which engage said tube, and a welded joint between said projections and said tube a portion of the tube between said projections being separated from the flue sheet by an air space.

4. A boiler comprising a metal flue sheet, a metal tube extending through said flue sheet, the thickness of the flue sheet being greater than the thickness of the metal of the tube, a portion of the metal of the flue sheet being removed at the point where the tube contacts with the flue sheet so as to make the thickness of the metal of the flue sheet and the tube at the point of contact substantially equal and a welded connection between the tube and the faces of the opening having the smallest diameter.

5. A boiler comprising a metal flue sheet, a metal tube extending through said flue sheet, the thickness of the flue sheet being greater than the thickness of the metal of the tube, a portion of the metal of the flue sheet being removed at the point where the tube contacts with the flue sheet so as to make the thickness of the metal of the flue sheet and the tube at the point of contact substantially equal and a welded joint between the flue sheet and the tube at the point of contact.

In testimony whereof, I affix my signature in the presence of two witnesses this 22nd day of January, 1916.

FREDERICK T. HUSTON.

Witnesses:
ESTHER VAN FRANK,
ELLA THIEME.